United States Patent Office 3,574,593
Patented Apr. 13, 1971

3,574,593
HERBICIDAL METHOD USING SUBSTITUTED
ALKYLSULFONYLIMIDAZOLES
Albert William Lutz, Montgomery Township, Somerset County, N.J., assignor to American Cyanamid Company, Stamford, Conn.
No Drawing. Original application July 21, 1967, Ser. No. 654,968, now Patent No. 3,499,001, dated Mar. 3, 1970. Divided and this application Sept. 24, 1969, Ser. No. 870,910
Int. Cl. A01n 9/22
U.S. Cl. 71—92
5 Claims

ABSTRACT OF THE DISCLOSURE

Substituted alkylsulfonylimidazole compounds of the formula:

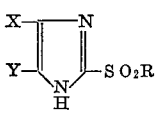

wherein R is a member selected from the group consisting of lower alkyl, alkenyl and aralkyl and X and Y are hydrogen, nitro, or halogen, at least one of X and Y being halogen. The compounds where one of X and Y is hydrogen or nitro are formed from the corresponding 2-alkylthioimidazole intermediates by oxidation of the intermediates with m-chloroperbenzoic acid or monoperphthalic acid, followed by halogenation. The compounds are highly active pre-emergence and post-emergence herbicides.

This is a division of application Ser. No. 654,968, filed July 21, 1967, now U.S. Pat. No. 3,499,001.

This invention relates to new alkylsulfonylimidazole compounds, to a method for preparing intermediates required in the preparation of certain of said new compounds, and to methods of controlling undesirable plant growth by use of the new compounds.

The new compounds of the invention may be depicted by the formula:

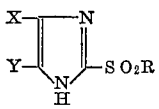

(I)

wherein R is a member selected from the group consisting of alkyl, alkenyl and aralkyl and X and Y are hydrogen, nitro or halogen, at least one of X and Y being halogen. Preferred alkyl groups are lower alkyl ($C_1$-$C_7$), particularly those containing from 1 to 4 carbon atoms. Halogen in the definition of X and Y includes chlorine, bromine and iodine. From the foregoing definition it should be understood that X and Y may be the same or different halogens and X or Y may be hydrogen or nitro provided that the other of X and Y is halogen.

The compounds of the invention include the obvious equivalents of Formula I compounds, particularly the tautometric forms and salts both of Formula I compounds and of the tautomers. Preferred salts are the water soluble salts such as the alkali metal (e.g., sodium, potassium) and ammonium salts.

The following are typical of the compounds of the invention. The numbering of the substituents on the imidazole ring corresponds with the numbering shown in Formula I above.

2-methylsulfonyl-4,5-dichloroimidazole
2-methylsulfonyl-4,5-dibromoimidazole
2-n-butylsulfonyl-4,5-diiodoimidazole
2-methylsulfonyl-4-chloro-5-bromoimidazole
2-ethylsulfonyl-4-chloro-5-nitroimidazole
2-n-propylsulfonyl-4-chloro-5-iodoimidazole
2-n-butylsulfonyl-4-nitro-5-bromoimidazole
2-methylsulfonyl-4-nitro-5-iodoimidazole
2-methylsulfonyl-4-bromo-5-iodoimidazole
2-isopropylsulfonyl-4,5-dichloroimidazole
2-methylsulfonyl-4-bromoimidazole
2-methylsulfonyl-4-chloroimidazole
2-n-butylsulfonyl-4-iodoimidazole
2-isobutyl-4,5-dichloroimidazole The preferred herbicidal compounds are the 2-lower alkylsulfonyl-4,5-substituted imidazoles in which the 4 and 5 substituents are either chlorine or bromine, for example:

2-methylsulfonyl-4,5-dichloroimidazole
2-methylsulfonyl-4,5-dibromoimidazole
2-methylsulfonyl-4-chloro-5-bromoimidazole Compounds of Formula I are prepared by the reaction of 2-mercaptoimidazole with an alkyl halide in an alkaline aqueous-alcoholic solution to produce 2-alkylthioimidazole as shown in (A) below wherein R is as defined above and X is halogen.

(A) 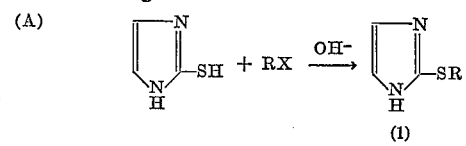

(1)

If it is desired that X or Y be nitro, the 2-alkylthioimidazole (1) is dissolved in concentrated nitric acid. Concentrated sulfuric acid is then added to the resulting solution and the reactants are heated for sufficient time to produce 2-alkylthio-4-nitroimidazole as shown in (B) below.

(B) 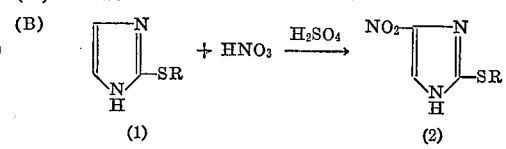

(1) (2)

The next synthesis step is the oxidation of either the 2-alkylthioimidazole (1) or 2-alkylthio-4-nitro-imidazole (2) to the appropriate 2-alkylsulfonylimidazole. This is accomplished by reacting either (1) or (2) with typical oxidizing agents such as m-chloroperbenzoic acid, monoperphthalic acid, peracetic acid, hydrogen peroxide, or aqueous or alcoholic chlorine solutions, in an inert organic solvent as illustrated in reactions (C) and (D) below.

(C) 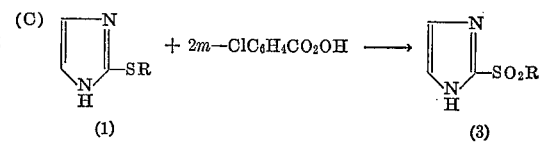

(1) (3)

(D) 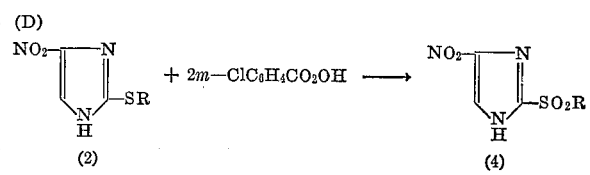

(2) (4)

Although most common oxidizing agents will suffice to produce the desired products (3) and (4), the form in which the product is produced has been found to vary markedly depending upon which oxidizing agent is employed. For example, the product ordinarily produced by the majority of oxidizing agents is an oily liquid mass which, in addition to the desired product, contains several other species of chemical composition as indicated by infra-red analytical techniques. The purification and isolation of the desired product (3) or (4) from this oily mass is extremely difficult and impractical. However, when m-chloroperbenzoic acid or mono-perphthalic acid is employed as the oxidizing agent, the desired product is surprisingly formed as a distinctly solid precipitate which upon analysis is found to contain the desired product plus spent oxidizing agent. The solid material is readily purified using conventional methods.

Other conditions of reactions (C) and (D) are non-critical. For example, while the reaction readily occurs with stoichiometric amounts of the imidazole and oxidizing agent, it is preferred to employ an excess of oxidizing agent. Preferred inert organic solvents are the lower alkanols such as methyl, ethyl and isopropyl alcohols, singly or in admixture with other inert solvents. The reaction may be effected above or below room temperature or at sub- or super-atmospheric pressures although it occurs readily at room temperature and atmospheric pressure. Order of additional is not critical but it is preferred to add the oxidizing agent to the imidazole solution. Reaction is substantially complete after addition of the oxidizing agent and no substantial advantage is gained by prolonging the reaction.

The final synthesis step for preparing compounds of Formula I involves substitution of the desired X and/or Y halogen in the 4 and/or 5 position of the imidazole ring of compounds (3) and (4) as illustrated in the examples below. These examples are not intended to limit the invention except as defined in the appended claims. All parts and percentages are by weight unless otherwise indicated.

EXAMPLE 1

Preparation of 2-methylthioimidazole

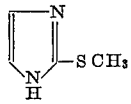

2-mercaptoimidazole (10.0 grams) was dissolved in 100 milliliters of a 1.0 N aqueous sodium hydroxide solution. A solution of methanolic methyl iodide (10.0 grams of methyl iodide dissolved in 100 milliliters of methanol) was added rapidly to the above solution with stirring. The reactants were held one to two hours at room temperature with stirring. The precipitate was then removed by filtration and air dried. After recrystallization from ethyl acetate, 8.1 grams of 2-methylthioimidazole (71% yield) were obtained with a melting point of 136.5–138° C.

The above procedure is followed in all essential respects except for substitution of the appropriate alykl halide or alkylthioalkyl halide for methyl iodide to yield:
2-(butylthio)imidazole, M.P. 71–72° C.
2-(allylthio)imidazole, M.P. 70–71° C.
2-[2-(methylthio)ethylthio]imidazole, M.P. 90–92° C. or
2-(dodecylthio)imidazole, M.P. 58–60° C.

EXAMPLE 2

Preparation of 2-methylthio-4-nitroimidazole

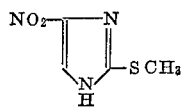

8.0 grams of 2-methylthioimidazole are dissolved in 16 milliliters of concentrated nitric acid followed by the addition, with cooling, of 16 milliliters of concentrated sulfuric acid. As soon as the initial reaction subsides, the reactants are heated for two hours. The solution is then cooled and poured into ice water. The solid product, 2-methylthio-4-nitroimidazole, is collected by filtration and recrystallized.

EXAMPLE 3

Preparation of 2-methylsulfonylimidazole

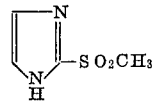

To a solution of 2-methylthioimidazole (5.0 grams in 100 milliliters of ethanol) was added with stirring and in a dropwise manner a solution of m-chloroperbenzoic acid (17.8 grams in 100 milliliters of ethanol). After the solution addition was complete, sufficient sodium sulfite was added to destroy any excess peroxide (as determined by the standard starchiodide test). The solvent was removed under vacuum and the white solid residue was extracted with ether to remove m-chlorobenzoic acid. The undissolved solid was recrystallized from methanol to give 4.9 grams (76.5% yield) of product with a melting point of 213–215° C.

*Analysis.*—Calculated for $C_4H_6N_2O_2S$ (percent): C, 32.88; H, 4.14; N, 19.18; S, 21.94. Found (percent): C, 32.56; H, 3.98; N, 19.14; S, 22.01.

The above procedure is followed in all essential respects except for substitution of the appropriate 2-alkylthioimidazole, 2-arylthioimidazole or 2-[2-(alkylthio)alkylthio]imidazole for 2-methylthioimidazole to yield:

2-(butylsulfonyl)imidazole, M.P. 148–151° C.
2-(allylsulfonyl)imidazole, M.P. 125–128° C.
2-[(2-methylsulfonyl)ethylsulfonyl]imidazole, M.P. 200–202° C.
2-(benzylsulfonyl)imidazole, M.P. 211.5–213° C.
2-(ethylsulfonyl)imidazole, M.P. 160–163° C.
2-(dodecylsulfonyl)imidazole, M.P. 102–104° C. or
2 - [(2,4 - dinitrophenyl)sulfonyl]imidazole, M.P. 224–225° C.

EXAMPLE 4

Preparation of 2-methylsulfonyl-4,5-dibromoimidazole

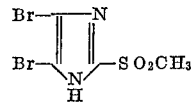

2-methylsulfonylimidazole (0.73 gram) was dissolved in 20 milliliters of 1.0 N sodium hydroxide solution and with stirring, bromine (1.60 grams) in 5 milliliters of chloroform was added dropwise while maintaining the temperature at about 25° C. After the addition was complete, a small amount of sodium bisulfite was added to discharge the color. The colorless aqueous layer was acidified to a pH of 1–2 with concentrated sulfuric acid and chilled to cause the precipitation of 1.0 grams (66% yield) of product as pale yellow needles with a melting point of 202–204° C. The product was dissolved in water and charcoal treated, and was then recrystallized from water to yield a white solid with a melting point of 211–212° C.

*Analysis.*—Calculated for $C_4H_4Br_2N_2O_2S$ (percent): C, 15.80; H, 1.33; N, 9.22; Br, 52.58. Found (percent): C, 16.05; H, 1.31; N, 9.29; Br, 52.31.

The above procedure is followed in all essential respects except for substitution of the appropriate 2-alkylsulfonylimidazole, 2-arylsulfonylimidazole or 2-[(2-alkylsulfonyl)alkylsulfonyl]imidazole for 2-methylsulfonylimidazole to yield:

2-(benzylsulfonyl)-4,5-dibromoimidazole, M.P. 234–236° C.
4,5-dibromo-2-[2-(methylsulfonyl)ethylsulfonyl]imidazole, M.P. 233–235° C.
4,5-dibromo-2-(ethylsulfonyl)imidazole, M.P. 209–211° C.
4,5-dibromo-2-(butylsulfonyl)imidazole, M.P. 159–161° C.
4,5-dibromo-2-[(2,4-dinitrophenyl)sulfonyl]imidazole 2-(allylsulfonyl)-4,5-dibromoimidazole, M.P. 185-190° C. or
2-(dodecylsulfonyl)-4,5-dibromoimidazole

EXAMPLE 5

Preparation of 2-methylsulfonyl-4,5-dichloroimidazole and 2-methylsulfonyl-4-bromo-5-chloroimidazole

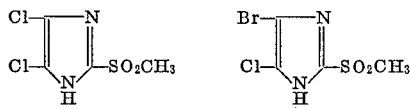

2-methylsulfonyl-4,5-dibromoimidazole (20.0 grams) was refluxed in 500 milliliters of concentrated hydrochloric acid for 24 hours with stirring. The reaction solution was diluted with 500 milliliters of water and then concentrated to a 300 milliliter volume. The pH was adjusted to 2.5-3.0 with ammonium hydroxide followed by chilling. The dried precipitate (8.1 grams) had a melting point of 178-181° C. Analysis by mass spectroscopy showed the product to contain 92% 2-methylsulfonyl-4,5-dichloroimidazole and 7% 2-methylsulfonyl-4-bromo-5-chloroimidazole.

A reduction in the reflux period increased the yield of the 4-bromo-5-chloro compound. For example, a 6-hour reflux period gave a product containing as much as 40% 2-methylsulfonyl-4-bromo-5-chloroimidazole.

EXAMPLE 6

Preparation of 2-methylsulfonyl-4-chloroimidazole

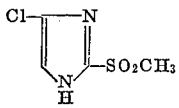

10.0 grams of 2-methylsulfonyl-4-bromo-5-chloroimidazole are refluxed in 100 milliliters of 20% aqueous sodium sulfite solution. The reactants are then chilled, the pH adjusted to 2, and the desired product isolated and purified in the usual manner.

EXAMPLE 7

Preparation of 2-methylsulfonyl-4-iodoimidazole

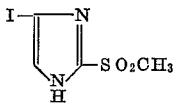

The procedure of Example 4 is repeated except that bromine is replaced by one equivalent of iodine to give 2-methylsulfonyl-4-iodoimidazole.

EXAMPLE 8

Preparation of 2-methylsulfonyl-4-iodo-5-bromoimidazole

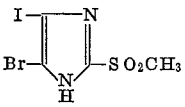

The procedure of Example 4 is repeated except that 2-methylsulfonylimidazole is replaced by 2-methylsulfonyl-4-iodoimidazole and a stoichiometric amount of bromine is added to give 2-methylsulfonyl-4-iodo-5-bromoimidazole.

EXAMPLE 9

Preparation of 2-methylsulfonyl-4-nitro-5-bromoimidazole

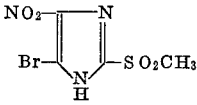

The procedure of Example 4 is repeated except that 2-methylsulfonylimidazole is replaced by 2-methylsulfonyl-4-nitroimidazole and a stoichiometric quantity of bromine is added to yield 2-methylsulfonyl-4-nitro-5-bromoimidazole.

The compounds of the invention are highly active pre-emergence and post-emergence herbicides. They may be dissolved or dispersed in known liquid carriers and applied in liquid sprays to the foliage of the plant or to the soil containing seeds of the plants to be controlled. They may also be applied as solids in dust or granular formulations with conventional application equipment. The proportions of compounds in such formulations, whether liquid or solid, are conventional and in general will be amounts effective to provide the herbicidal activity. If desired, other additives, such as pesticides and wetting agents, may be employed with the herbicidal compounds.

It has surprisingly been observed that the alkyl sulfonyl group in the compounds appears responsive for the excellent herbicidal activity, both against broad and narrow leaf plant species. The reason for this is that when the alkyl sulfonyl group is replaced with certain other groups such as methyl and ethyl, the herbicidal activity of the compounds is either insignificant or substantially inferior to that of the alkyl sulfonyl substituted imidazoles, all other things being equal. Examples 10 and 11 illustrate the utility of compounds of the invention.

EXAMPLE 10

The pre-emergence herbicidal activity of the compounds of the invention is exemplified by the following tests in which the seeds of a variety of monocotyledonous and dicotyledonous plants are separately mixed with potting soil in separate pint cups. After planting, the cups are sprayed with the selected aqueous-acetone solution containing small amounts of a wetting agent and the test compound in sufficient quantity to provide the equivalent of 2 or 10 pounds per acre of test compound per cup. The treated cups are then placed on greenhouse benches and cared for in the usual manner, in accordance with greenhouse procedures. Two weeks after treatment, the tests are terminated and each cup is examined and rated, as shown in Table I, according to the Herbitoxicity Index defined below.

Herbitoxicity index

9=100% reduction in stand
9−=1 or 2 stunted plants remaining
8=85-100% reduction in stand
7=70-85% reduction in stand
6=60-70% reduction in stand
5=50-60% reduction in stand
4=40-50% reduction in stand
3=30-40% reduction in stand
2=20-30% reduction in stand
1=10-20% reduction in stand
0=no apparent effect
s=severe injury
m=moderate injury
t=trace of slight injury
—=no test
r=regrowth Abbreviations for plant species employed in the herbicidal activity tests of Examples 10 and 11 are as follows:

Bi—Bindwood
CT—Canada Thistle
JG—Johnson Grass
NS—Nutsedge
QG—Quackgrass
Ko—Kochia
La—Lambsquarters
Mu—Mustard
Pi—Pigweed
Ba—Barnyardgrass
Cr—Crabgrass
GF—Green Foxtail
WO—Wild Oats
Mi—Millet
Ra—Radish

PRE-EMERGENCE—TABLE I

| Test compound | Rate (lbs./acre) | Ko | La | Mu | Pi | Ba | Cr | GF | WO | Mi | Ra |
|---|---|---|---|---|---|---|---|---|---|---|---|
| Br—[N-N(H)]—$SO_2CH_3$ (Br) | 2 | 8 | 5m | 8 | 9- | t | 5 | 9- | 9 | — | — |
|  | 10 | 9- | 9- | 9 | 9 | 8s | 9- | 9 | 9 | — | — |
| Cl—[N-N(H)]—$SO_2CH_3$ (Cl) | 10 | 8s | 8s | 9 | 9 | m | s | 5s | 9- | — | — |
| Br—[N-N]—$SO_2CH_2$–C$_6H_5$ (Br) | 25 | — | — | 9 | — | — | — | — | — | 0 | 9 |
| Br—[N-N]—$SO_2CH_2CH=CH_2$ (Br) | 25 | — | — | 9 | — | — | — | — | — | 9 | 9 |
| Br—[N-N]—$SO_2C_4H_9n$ (Br) | 25 | — | — | 9c | — | — | — | — | — | 0 | 9- |
| Br—[N-N]—$SO_2C_2H_5$ (Br) | 25 | — | — | 9- | — | — | — | — | — | 9 | 9- |

EXAMPLE 11

The post-emergence herbicidal activity of the compounds of the instant invention is demonstrated by treating a variety of monocotyledonous and dicotyledonous plants with the compounds dispersed in aqueous-acetone mixtures. In the test seedling plants are grown in jiffy flats for about two weeks. The test compounds are dispersed in 50/50 acetone/water mixtures containing small amounts of a wetting agent in sufficient quantity to produce concentrations of about 0.4, 2, or 10 pounds per acre of active compound when applied to the plants through a spray nozzle operating at 30 p.s.i. for a predetermined time. After spraying, the plants are placed on greenhouse benches and are cared for in the usual manner, commensurate with conventional greenhouse practices. Two weeks after treatment, the seedling plants are examined and rated in Table II below according to the Herbitoxicity Index defined above.

POST-EMERGENCE—TABLE II

| Test compound | Rate (lbs./acre) | BW | CT | JG | NS | QG | Ko | La | Mu | Pi | Ba | Cr | CF | WO |
|---|---|---|---|---|---|---|---|---|---|---|---|---|---|---|
| Br—[N-N(H)]—$SO_2CH_3$ (Br) | 0.4 | — | — | — | — | — | 0 | t | 9 | t | 0 | 0 | t | t |
|  | 2 | s,r | 9 | 0 | 0 | 0 | 9 | 9 | 9 | 9 | t | t | 9- | 9 |
|  | 10 | 9 | 9 | t | 0 | 9 | 9 | 9 | 9 | 9 | 9 | 9 | 9 | 9 |
| Cl—[N-N(H)]—$SO_2CH_3$ (Cl) | 0.4 | — | — | — | — | — | 0 | 0 | 9 | 0 | 0 | 0 | 0 | t |
|  | 2 | — | — | — | — | — | t | s | 9 | m | 0 | 0 | m | 9- |
|  | 10 | — | — | — | — | — | 9 | 9 | 9 | 9 | m | 0 | 8 | 9 |
| Br—[N-N]—$SO_2$–$CH_3$–C$_6H_5$ (Br) | 10 | — | — | — | — | — | — | 9 | 9 | 0 | t | t | — | — |
| Br—[N-N]—$SO_2$–$CH_2CH=CH_2$ (Br) | 10 | — | — | — | — | — | — | 9 | 9 | 9 | 9 | s | — | 9 |
| Br—[N-N]—$SO_2C_4H_9$–n (Br) | 10 | — | — | — | — | — | — | s | s | t | s | m | — | t |
| Br—[N-N]—$SO_2C_2H_5$ (Br) | 10 | — | — | — | — | — | — | 9 | 9- | 9 | 9 | 9 | — | — |

I claim:
1. A method of controlling undesirable plant species comprising applying thereto a herbicidally effective amount of a imidazole compound of the formula:

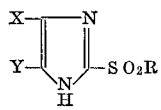

wherein R is a member selected from the group consisting of alkyl having 1 to 12 carbon atoms, lower alkenyl, and benzyl, and X and Y are hydrogen, nitro or halogen, at least one of X and Y being halogen.

2. The method of claim 1 wherein the imidazole compound is 2-(allylsulfonyl)-4,5-dibromoimidazole.

3. The method of claim 1 wherein the imidazole compound is 2-methylsulfonyl-4,5-dibromoimidazole.

4. The method of claim 1 wherein said imidazole compound is applied to the foliage of said undesirable plant species.

5. The method of claim 1 wherein said imidazole compound is applied to soil containing seeds of said undesirable plant species.

References Cited
UNITED STATES PATENTS

| | | | |
|---|---|---|---|
| 2,710,870 | 6/1955 | Lawson, Jr. | 71—92X |
| 3,261,873 | 7/1966 | Johnson | 71—92X |
| 3,480,643 | 11/1969 | Lutz et al. | 71—92X |

JAMES O. THOMAS, JR., Primary Examiner